United States Patent
Ainslie et al.

(10) Patent No.: US 8,572,515 B2
(45) Date of Patent: Oct. 29, 2013

(54) TURNING ON AND OFF FULL SCREEN MODE ON A TOUCHSCREEN

(75) Inventors: Alex Neely Ainslie, San Francisco, CA (US); Roma Rajni Shah, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/308,466

(22) Filed: Nov. 30, 2011

(65) Prior Publication Data

US 2013/0135221 A1     May 30, 2013

(51) Int. Cl.
 *G06F 3/041*     (2006.01)
(52) U.S. Cl.
 USPC ............ 715/863; 715/765; 715/781; 345/173
(58) Field of Classification Search
 USPC ......... 715/764, 765, 769, 781, 810, 835, 863, 715/864; 345/169, 173
 See application file for complete search history.

(56) References Cited

U.S. PATENT DOCUMENTS

| | | |
|---|---|---|
| 5,581,243 A | 12/1996 | Ouellette et al. |
| 7,557,800 B2 | 7/2009 | Yanagisawa |
| 8,199,125 B2 * | 6/2012 | Misawa et al. ................ 345/173 |
| 2009/0213086 A1 * | 8/2009 | Chae et al. .................... 345/173 |
| 2009/0278806 A1 * | 11/2009 | Duarte et al. ................ 345/173 |
| 2009/0293007 A1 * | 11/2009 | Duarte et al. ................ 715/767 |
| 2010/0095240 A1 * | 4/2010 | Shiplacoff et al. ............ 715/784 |
| 2010/0229130 A1 * | 9/2010 | Edge et al. .................... 715/863 |
| 2010/0238123 A1 | 9/2010 | Ozias et al. |
| 2010/0241958 A1 * | 9/2010 | Fish .............................. 715/702 |
| 2011/0179387 A1 * | 7/2011 | Shaffer et al. ................ 715/835 |
| 2011/0191669 A1 * | 8/2011 | Yang et al. .................... 715/252 |
| 2011/0234491 A1 * | 9/2011 | Nurmi .......................... 345/157 |
| 2011/0254912 A1 * | 10/2011 | Mock et al. ................ 348/14.03 |
| 2012/0017180 A1 * | 1/2012 | Flik et al. ...................... 715/838 |
| 2012/0023431 A1 * | 1/2012 | Roth et al. .................... 715/772 |
| 2012/0137216 A1 * | 5/2012 | Choi ............................. 715/255 |

FOREIGN PATENT DOCUMENTS

KR   10-2007-0113016   11/2007

* cited by examiner

*Primary Examiner* — Xiomar L Bautista
(74) *Attorney, Agent, or Firm* — McDermott Will & Emery LLP (57) ABSTRACT

Systems and methods for turning on and off full screen mode of an application running on a touchscreen. In some aspects, a method includes receiving an input on the touchscreen; determining whether the input is a first predetermined gesture; and turning off full screen mode when the input is the first predetermined gesture. The method also includes determining whether the first predetermined gesture starts from a predetermined area.

16 Claims, 10 Drawing Sheets

TURNING ON AND OFF FULL SCREEN MODE ON A TOUCHSCREEN

BACKGROUND

The subject technology generally relates to touchscreens in electronic devices.

Touchscreens are now used in many electronic devices, including desktop computers, laptop computers, tablet computers, mobile phones, smartphones, personal digital assistants (PDAs), and navigation devices. For example, tablet computers no longer include a physical keyboard. Instead, a virtual keyboard is displayed on a touchscreen, and a user interacts with the tablet computer by pressing displayed keys. Users can also interact directly with what is displayed on the touchscreen with, e.g., his (her) fingers or a stylus.

Full screen mode is a display mode to open an application window to the full monitor screen size. Because full screen mode uses every available pixel, it makes working on smaller screens, which have limited screen real estate, more practical. On the other hand, since toolbars and menus are hidden in full screen mode, users lose direct access to them. To exit full screen mode, a user usually needs to press the touchscreen to cause toolbars, menus or tabs to be displayed, and then press the touchscreen again to select a tab to exit full screen mode.

Therefore, it would be desirable to provide a more user friendly method to turn on and off full screen mode.

SUMMARY

In one innovative aspect, the disclosed subject matter can be embodied in a method that includes receiving an input on a touchscreen, determining whether the input is a first predetermined gesture when a graphical display of an application is displayed on the touchscreen in full screen mode, and turning off full screen mode when the input is the first predetermined gesture.

These and other embodiments can include one or more of the following features. The method may include determining whether the input starts from a predetermined area on the touchscreen. The predetermined area may be an edge of the graphical display. The predetermined area may comprise a predetermined number of lines of pixels in the edge of the graphical display. The first predetermined gesture may be a gesture for dragging along a predetermined direction from the predetermined area. The first predetermined gesture may be a dragging gesture toward a center of the touchscreen. The first predetermined gesture may be a downward gesture dragging from a top edge of the graphical display, an upward gesture dragging from a bottom edge of the graphical display, a leftward gesture dragging from a right edge of the graphical display, and a rightward gesture dragging from a left edge of the graphical display. The method may include determining whether a distance of an input gesture exceeds a predetermined threshold distance. The method may include displaying a toolbar of the application on the touchscreen when the distance of the input gesture does not exceed the predetermined threshold distance. The method may include turning off full screen mode when distance of the input gesture exceeds the predetermined threshold distance. The method may include determining whether the input is a second predetermined gesture when full screen mode is turned off and turning on full screen mode when the input is the second predetermined gesture. The method may include determining whether the input starts from a second predetermined area on the touchscreen. The second predetermined area may be a touch sensitive edge of a graphical user interface (GUI) of the application.

In one innovative aspect, the disclosed subject matter can be embodied in a non-transitory computer-readable medium that includes instructions. The instructions may include code for receiving an input on a touchscreen, determining whether the input is a predetermined gesture for turning on full screen mode when an application is in windowed screen mode, and turning on full screen mode when the input is the predetermined gesture for turning on full screen mode. The instructions may also include code for determining whether the input is a predetermined gesture for turning off full screen mode when the application is in full screen mode, and turning off full screen mode when the input is the predetermined gesture for turning off full screen mode.

In one innovative aspect, the disclosed subject matter can be embodied in an electronic device which may include a processor, a touchscreen coupled to the processor via a bus, and a memory coupled to the processor and the touchscreen via the bus and storing instructions. The instructions may include code for receiving an input on a touchscreen, determining whether the input is a first predetermined gesture when a graphical display of an application is displayed on the touchscreen in full screen mode, and turning off full screen mode when the input is the first predetermined gesture.

These and other embodiments can include one or more of the following features. The electronic device may determine whether the input starts from a predetermined area on the touchscreen. The first predetermined gesture may be a gesture for dragging along a predetermined direction from the predetermined area. The electronic device may determine whether a distance of an input gesture exceeds a predetermined threshold distance and turn off full screen mode when distance of the input gesture exceeds the predetermined threshold distance. The electronic device may determine whether the input is a second predetermined gesture when full screen mode is turned off and turn on full screen mode when the input is the second predetermined gesture.

Advantageously, aspects of the subject technology provide, among other things, techniques for turning on and off full screen mode of an application running on a touchscreen with one gesture, instead of two clicks. As a result, interaction with a touchscreen, or an electronic device including a touchscreen, may be simpler, easier and more intuitive.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for turning on and off full screen mode on a touchscreen. One technique involves detecting a user input on the touchscreen and determining whether the user input is a predetermined gesture. Full screen mode may be turned on when the touchscreen is in windowed screen mode and the user input is a predetermined gesture for turning on full screen mode. Full screen mode may be turned off when the touchscreen is in full screen mode and the user input is a predetermined gesture for turning off full screen mode. The technique may include determining whether the user input starts at a predetermined area to prevent unintended exit of full screen mode. The technique may also include determining whether a distance of an input gesture on the touchscreen exceeds a predetermined distance to distinguish a user input for exiting full screen mode from an overscroll input.

Figure 1:
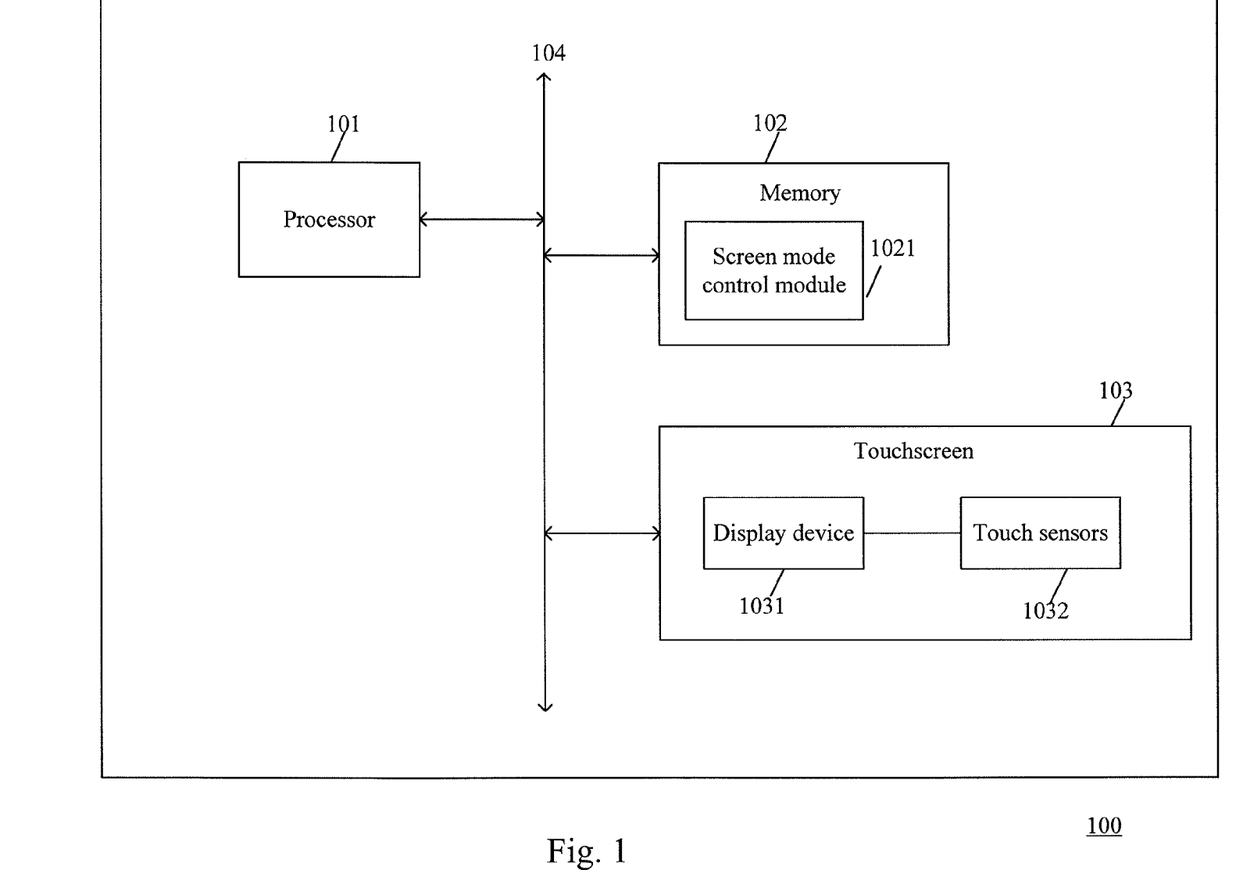
FIG. 1 shows a block diagram of an electronic device with a touchscreen according to one embodiment of the present invention.

FIG. 1 shows a block diagram of an electronic device 100 with a touchscreen according to one embodiment of the present invention. The electronic device 100 may be any device capable of displaying content, for example, via a web browser or via a specialized application. The electronic device 100 may be, for example, a desktop computer, a laptop computer, a tablet computer, a mobile phone, a PDA, a smartphone, a television, a monitor, or a navigation device. Persons skilled in the art will recognize other devices that could use a touchscreen.

As shown, the electronic device 100 may include a processor 101, a memory 102, and a touchscreen 103 coupled to each other via a bus 104.

The processor 101 may be configured to execute computer instructions stored in a computer-readable medium, for example, the memory 102. The processor 101 may be a central processing unit (CPU). The processor 101 can be any commercially available processors, including a single processor or a multi-core processor.

The touchscreen 103 may include a display device 1031 and an array of touch sensors 1032. The display device 1031 may display multiple-pixel graphics according to signals from the processor 101. The touch sensors 1032 may be arranged under the display device 1031 and identify a location of a user input when the user touches the top surface of the display device 1031. The touchscreen 103 may be any commercially available touchscreens, e.g., a capacitive panel, a surface capacitance panel, a projected capacitance panel, a resistive touchscreen panel, a surface acoustic wave panel, an acoustic pulse recognition panel, an infrared panel, a strain gauge panel, an optical imaging panel, and a dispersive signal technology panel.

The memory 102 may store data and instructions. As illustrated, the memory 102 may store a screen mode control module 1021. The processor 101 may be configured to execute instructions from the screen mode control module 1021 to turn on or off full screen mode in response to a user input. The screen mode control module 1021 may include programming for receiving a user input detected by the touch sensors 1032, determining whether to turn on or off full screen mode according to the user input, and controlling the processor 101 to perform a routine to turn on or off full screen mode accordingly. Various processes controlled by the screen mode control module 1021 will be described in more detail below with reference to FIGS. 4, 6, and 8.

Figure 2:
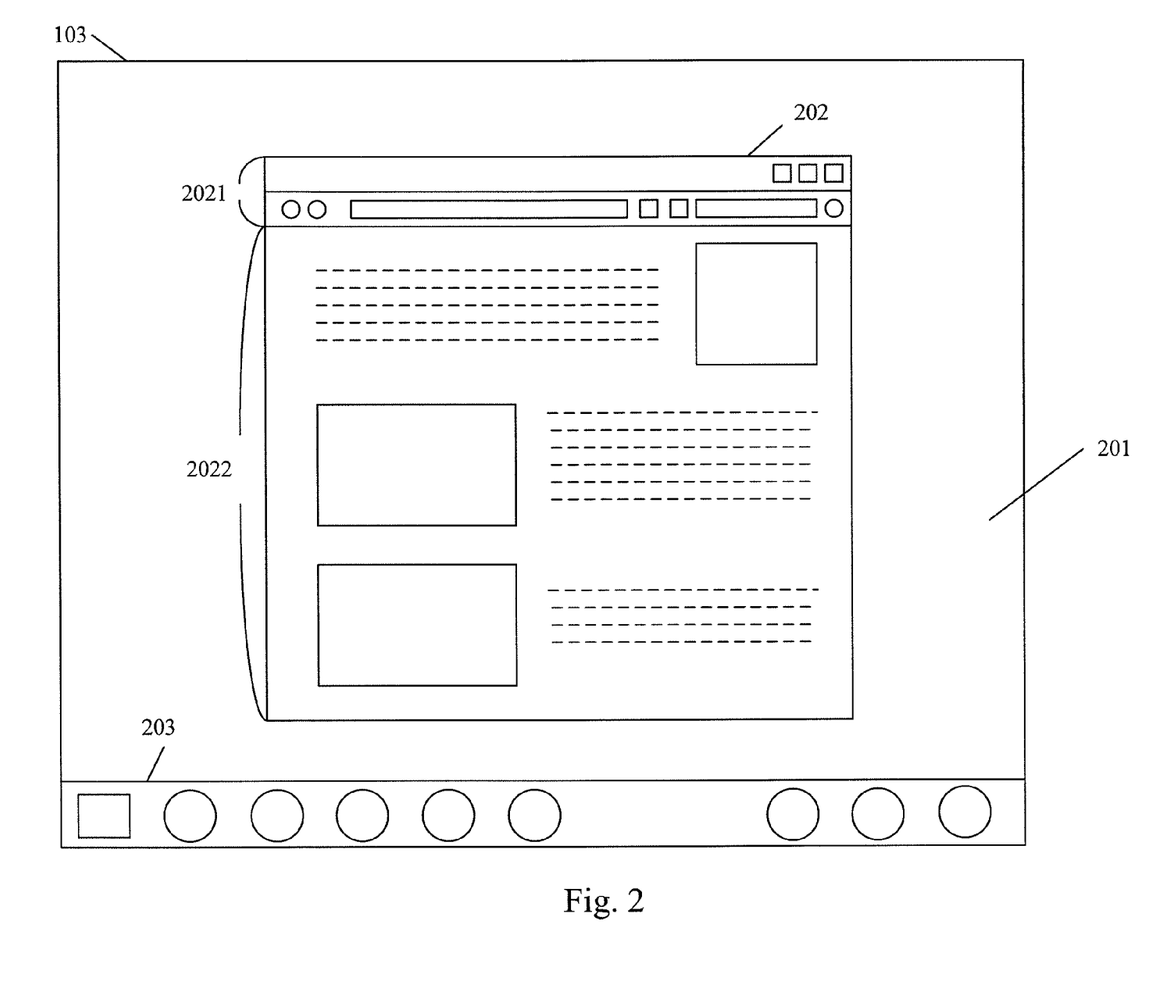
FIG. 2 shows a graphical display in windowed screen mode.

FIG. 2 shows a touchscreen 103 displaying a graphical display 201 in windowed screen mode. As shown, the touchscreen 103 is fully occupied by the graphical display 201. The graphical display 201 may include a graphical user interface (GUI) 202 of an application at its center and a menu bar 203 at its bottom. The GUI 202 may include a toolbar 2021 and a content portion 2022. In one embodiment, the application may be a web browser. Persons skilled in the art will recognize that the application may be an email application, an instant messaging application, a word processing application, a spreadsheet application, a presentation application, a gaming application, a mapping application, a video service application or other applications.

Figure 3:
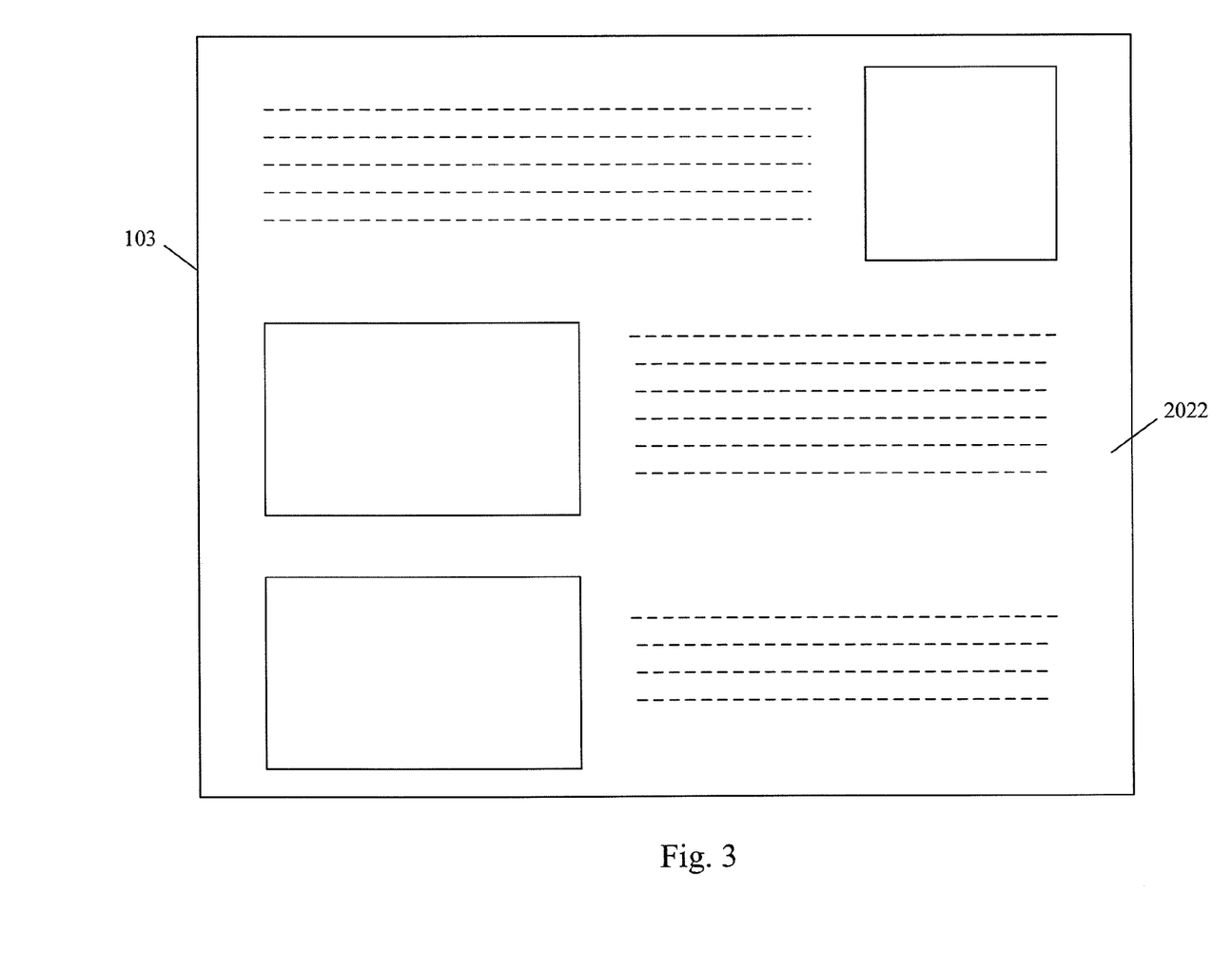
FIG. 3 shows a graphical display in full screen mode.

FIG. 3 shows a touchscreen 103 displaying the graphical display 201 in full screen mode. As shown, the touchscreen 103 is fully occupied by the content portion 2022 of the GUI 202, instead of by the graphical display 201. The toolbar 2021 of the GUI 202 and the menu bar 203 are hidden.

Figure 4:
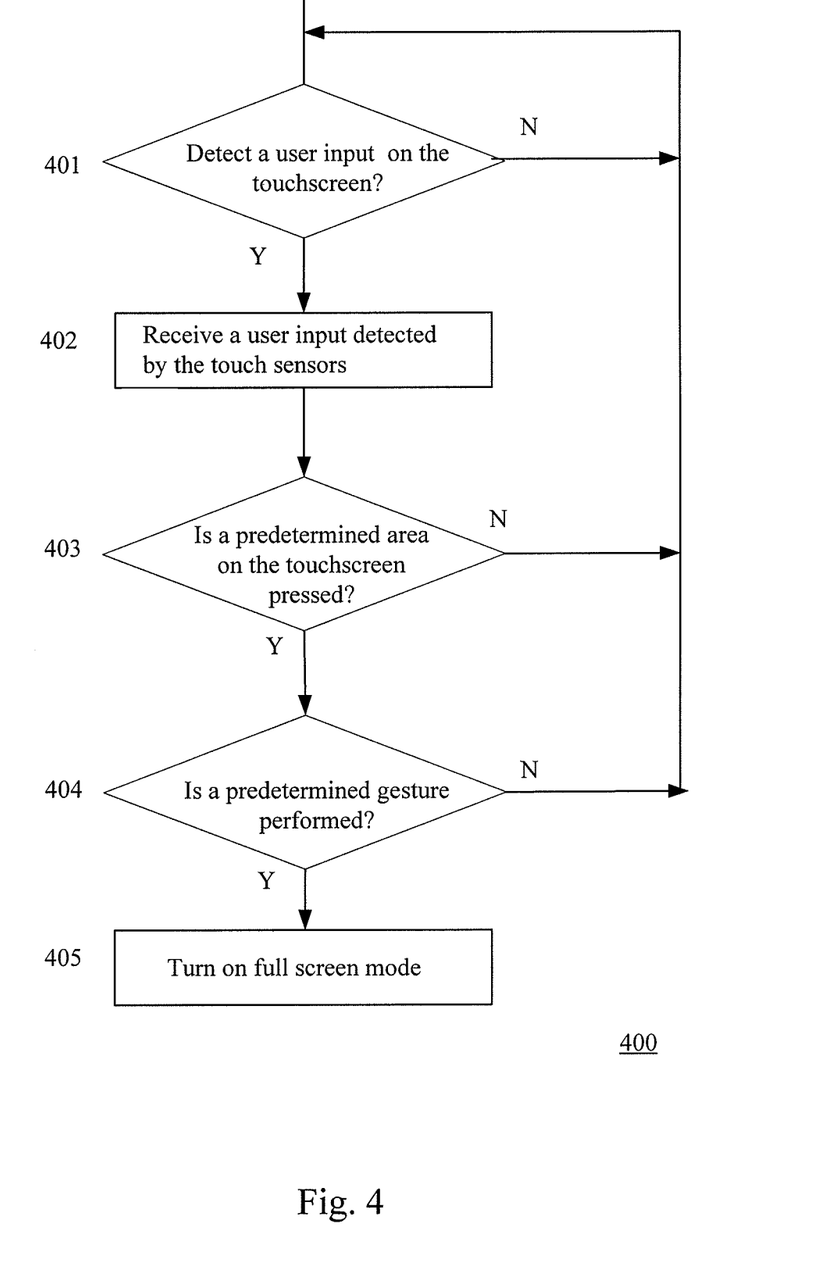
FIG. 4 is a flowchart of a process for turning on full screen mode according to one embodiment of the present invention.

FIG. 4 is a flowchart of a process 400 for turning on full screen mode according to one embodiment of the present invention. The process 400 may be performed by the electronic device 100 shown in FIG. 1.

The process 400 may begin at 401 where the touchscreen 103 is displaying the graphical display 201 in windowed screen mode, as shown in FIG. 2.

At 401, the touch sensors 1032 may detect whether there is a user input on the touch screen 103. If not, 401 may be repeated.

Otherwise, at 402, the screen mode control module 1021 may receive the user input detected by the touch sensors 1032.

At 403, the screen mode control module 1021 may determine whether the user input starts from a predetermined area on the touchscreen 103. In one embodiment, the predetermined area may be a touch sensitive edge or frame of the GUI 202, e.g., its top edge, bottom edge, left edge or right edge. In one embodiment, the predetermined area may be limited to, e.g., the five topmost lines of pixels in the top edge of the GUI 202, to prevent an unintended full screen activation.

If the user input does not start from the predetermined area, the process may return to 401.

Figure 5:
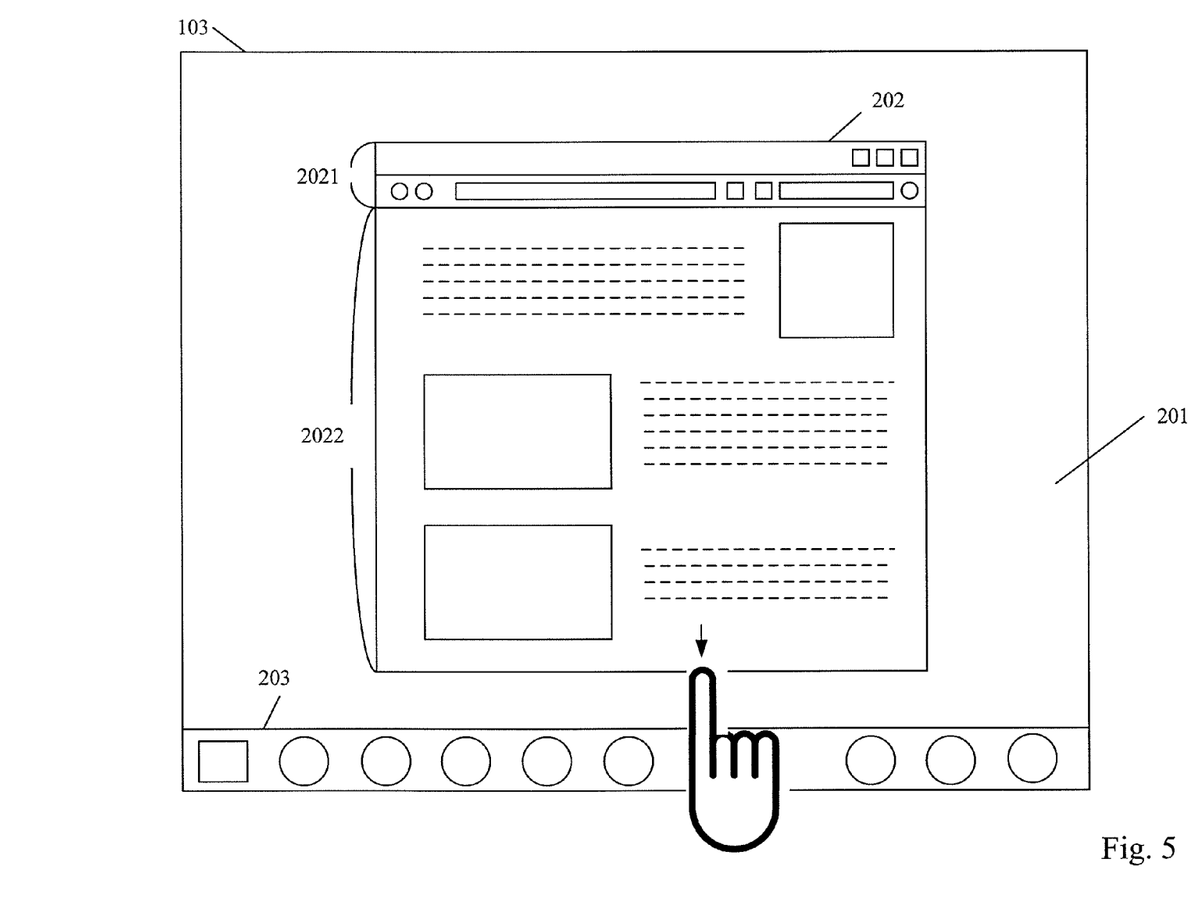
FIG. 5 shows a gesture for turning on full screen mode according to one embodiment of the present invention.

Otherwise, at 404, the screen mode control module 1021 may determine whether the user input is a predetermined gesture. In one embodiment, the predetermined gesture may be a drag gesture for dragging a predetermined portion of the GUI 202 along a predetermined direction. In one embodiment, the predetermined direction may be a direction outward from the center of the GUI 202. In one embodiment, the predetermined gesture may be a downward gesture dragging the bottom edge of the GUI 202, as shown in FIG. 5. In one embodiment, the predetermined gesture may be an upward gesture dragging the top edge of the GUI 202. In one embodiment, the predetermined gesture may be a leftward gesture dragging the left edge of the GUI 202. In one embodiment, the predetermined gesture may be a rightward gesture dragging the right edge of the GUI 202. In one embodiment, the predetermined gesture can only occur from a certain edge (e.g., the top edge).

If the user input is not a predetermined gesture, the process may return to 401.

Otherwise, at 405, the screen mode control module 1021 may determine that full screen mode needs to be turned on and enable the processor 101 to perform a routine to exit windowed screen mode shown in FIG. 2 and enter full screen mode shown in FIG. 3. The edges of the GUI 202, the toolbar 2021 of the GUI 202 and the menu bar 203 are hidden, and the content portion 2022 of the GUI 202 may be enlarged to fully occupy the touchscreen 103.

It should be understood that the flowchart shown in FIG. 4 is used to explain the invention, instead of limiting the sequence of the steps. For example, 404 may be performed before 403.

Figure 6:
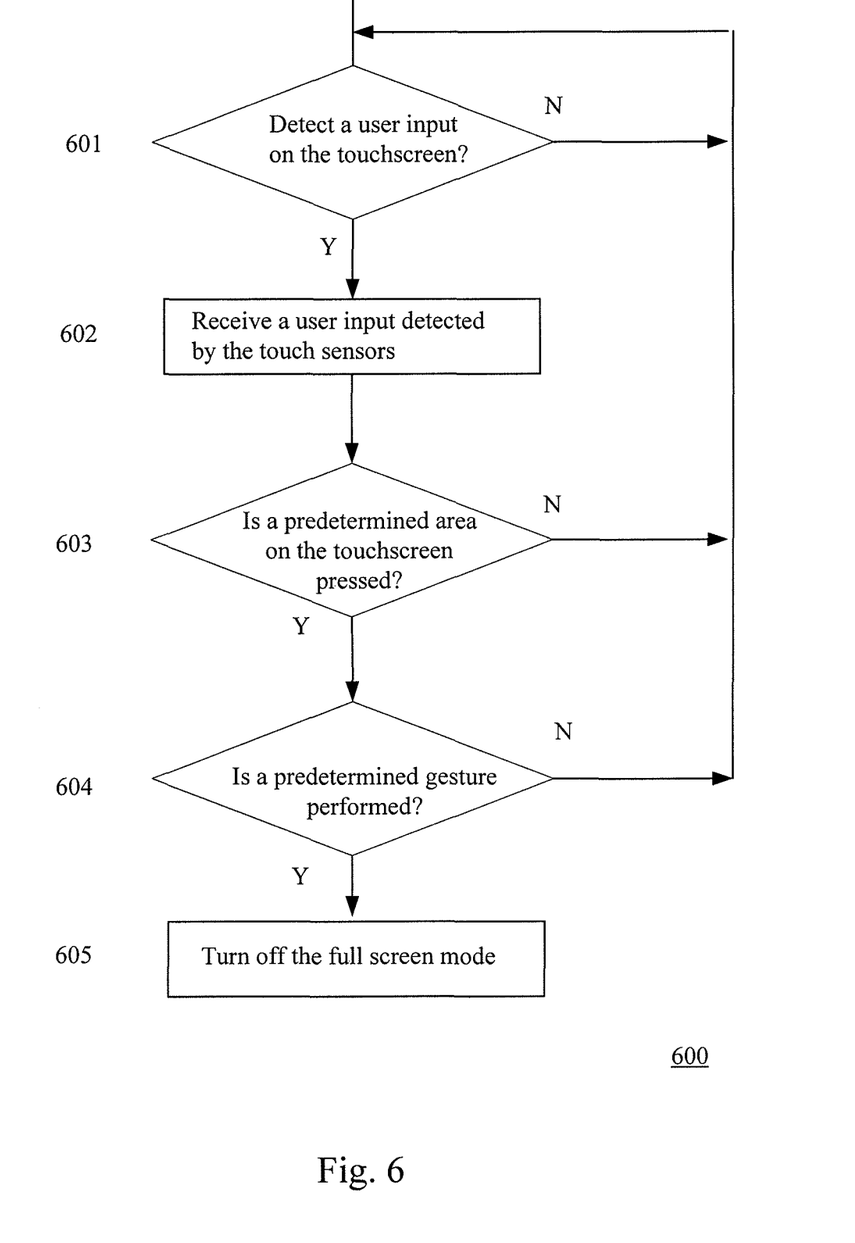
FIG. 6 is a flowchart of a process for turning off full screen mode according to one embodiment of the present invention.

When the touchscreen 103 is in full screen mode, the screen mode control module 1021 may detect a subsequent user input for exiting full screen mode. FIG. 6 is a flowchart of a process 600 for turning off full screen mode according to one embodiment of the present invention. The process 600 may be performed by the electronic device 100 shown in FIG. 1.

The process 600 may begin at 601 where the touchscreen 103 is displaying the graphical display 201 in full screen mode, as shown in FIG. 3.

At 601, touch sensors 1032 may detect whether there is a user input on the touchscreen 103. If not, 601 may be repeated.

Otherwise, at 602, the screen mode control module 1021 may receive a user input detected by the touch sensors 1032.

At 603, the screen mode control module 1021 may determine whether the user input starts from a predetermined area on the touchscreen 103. In one embodiment, the predetermined area may be an edge of the content portion 2022, e.g., its top edge, bottom edge, left edge or right edge, which are also the top, bottom, left or right edge of the touchscreen 103 in full screen mode. In one embodiment, the predetermined area may be limited to, e.g., the five topmost lines of pixels in the top edge of the content portion 2022, to prevent an unintended full screen exit.

If the user input does not start from the predetermined area on the touchscreen 103, the process may return to 601.

Figure 7:
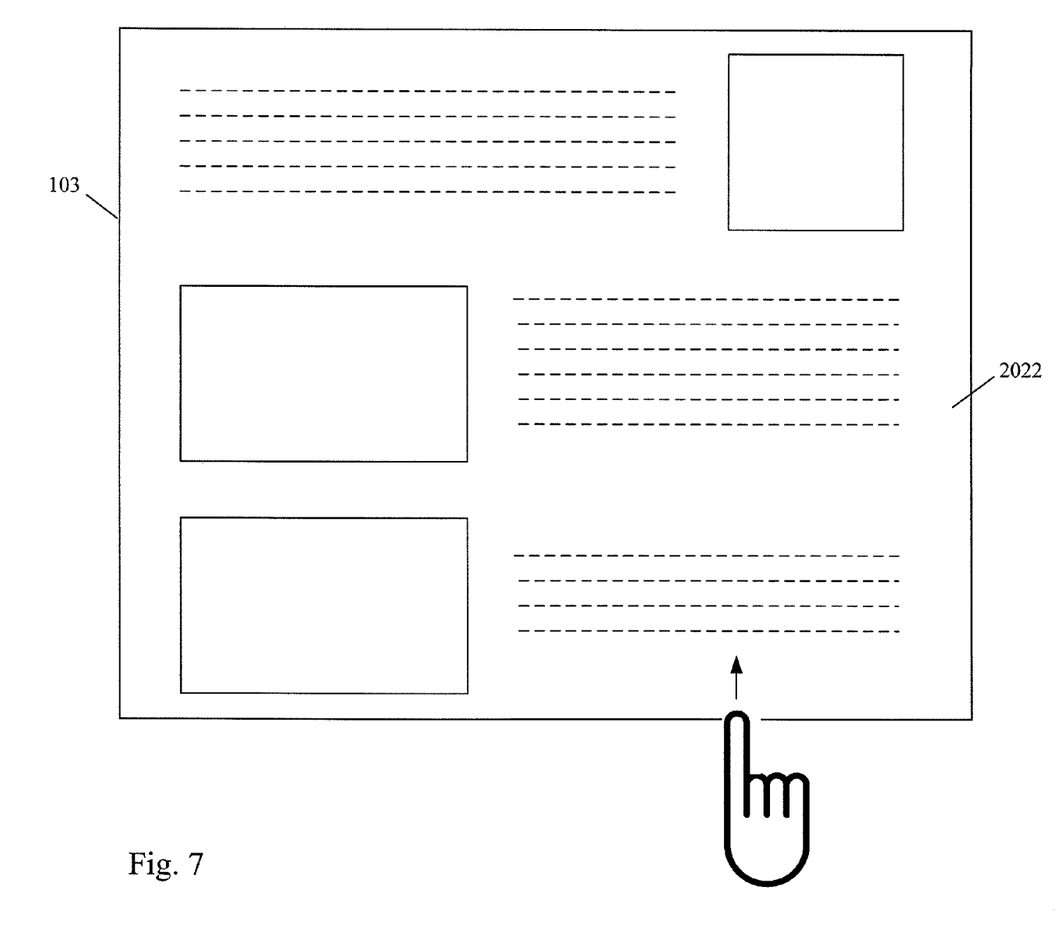
FIG. 7 shows a gesture for turning off full screen mode according to one embodiment of the present invention.

Otherwise, at 604, the screen mode control module 1021 may determine whether the user input is a predetermined gesture. In one embodiment, the predetermined gesture may be a drag gesture for dragging a predetermined edge of the content portion 2022 along a predetermined direction, starting from the predetermined area. In one embodiment, the predetermined direction is a direction inward toward the center of the content portion 2012, which is also the center of the touchscreen 103 in full screen mode. In one embodiment, the predetermined gesture is an upward gesture dragging the bottom edge of the content portion 2022, as shown in FIG. 7. In one embodiment, the predetermined gesture is a downward gesture dragging the top edge of the content portion 2022. In one embodiment, the predetermined gesture is a leftward gesture dragging the right edge of the content portion 2022. In one embodiment, the predetermined gesture is a rightward gesture dragging the left edge of the content portion 2022. In one embodiment, the predetermined gesture can only occur from a certain edge (e.g., the bottom).

If the user input is not a predetermined gesture, the process may return to 601.

Otherwise, at 605, the screen mode control module 1021 may determine that full screen mode needs to be turned off, and enable the processor 101 to perform a routine to exit full screen mode shown in FIG. 3 and enter windowed screen mode shown in FIG. 2. The complete GUI 202 is displayed at the center of the touchscreen 103, and the menu bar 203 is displayed at the bottom of the touchscreen 103.

Figure 8:
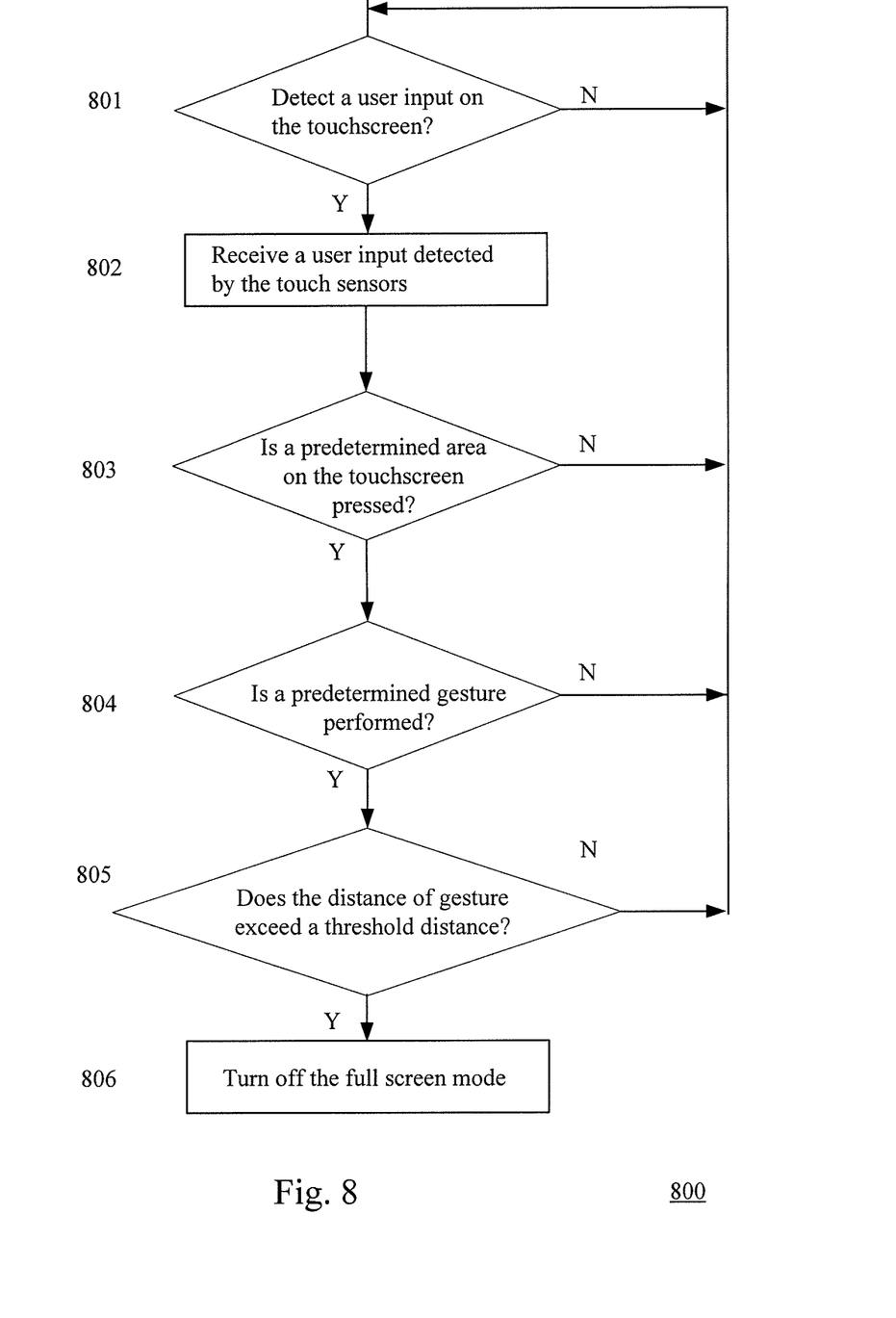
FIG. 8 is a flowchart of a process for turning off full screen mode according to one embodiment of the present invention.

Some electronic devices with touchscreens have the overscroll feature, which allows users to scroll beyond the beginning or end of a list of items currently displayed on a touchscreen. Since an input for scrolling beyond the end of a list of items is an upward drag gesture, similar to the predetermined gesture for exiting full screen mode, the screen mode control module 1021 may be configured to distinguish the two to prevent an unintended exit of full screen mode. FIG. 8 is a flowchart of a process 800 for turning off full screen mode according to one embodiment of the present invention. The process 800 may be performed by the electronic device 100 shown in FIG. 1, and may prevent unintended exit of full screen mode by using a threshold distance.

The process 800 may begin at 801 where the touchscreen 103 is displaying the graphical display 201 in full screen mode, as shown in FIG. 3.

At 801, the touch sensors 1032 may detect whether there is a user input on the touchscreen 103. If not, 801 may be repeated.

Otherwise, at 802, the screen mode control module 1021 may receive a user input detected by the touch sensors 1032.

At 803, the screen mode control module 1021 may determine whether the user input starts from a predetermined area on the touchscreen 103. In one embodiment, the predetermined area may be an edge of the content portion 2022, e.g., its top edge, bottom edge, left edge or right edge, which are also the top, bottom, left or right edge of the touchscreen 103 in full screen mode. In one embodiment, the predetermined area may be limited to, e.g., the five topmost lines of pixels in the top edge of the content portion 2022, to prevent an unintended full screen exit.

If the user input does not start from the predetermined area on the touchscreen 103, the process may return to 801.

Figure 9:
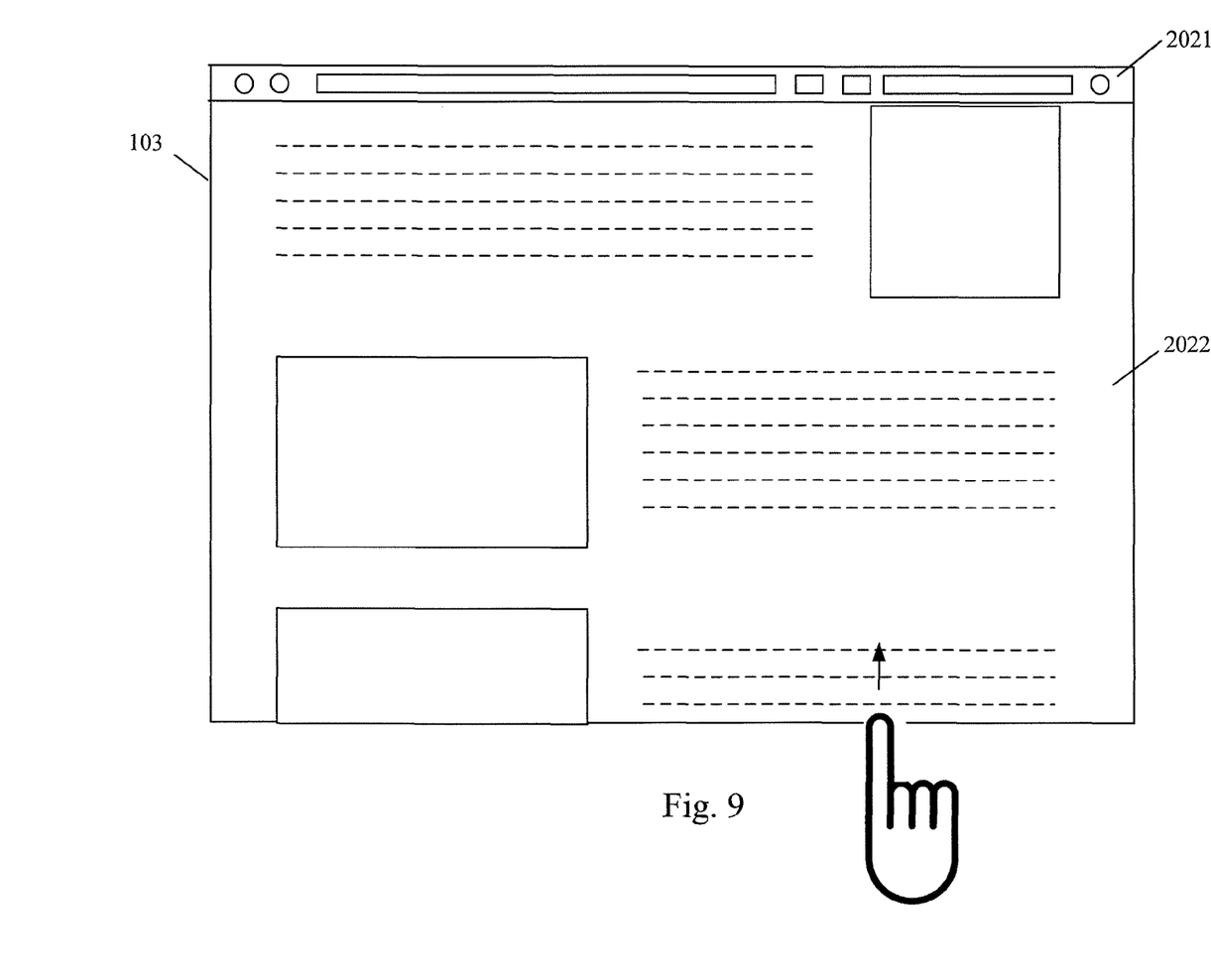
FIG. 9 shows a gesture for turning off full screen mode according to one embodiment of the present invention.

Otherwise, at 804, the screen mode control module 1021 may determine whether the user input is a predetermined gesture. In one embodiment, the predetermined gesture may be a drag gesture for dragging a predetermined portion of the content portion 2022 along a predetermined direction, starting from the predetermined area. In one embodiment, the predetermined direction is a direction inward toward the center of the content portion 2022, which is also the center of the touchscreen 103 in full screen mode. In one embodiment, the predetermined gesture is an upward gesture dragging the bottom edge of the content portion 2022, as shown in FIG. 9. In one embodiment, the predetermined gesture is a downward gesture dragging the top edge of the content portion 2022. In one embodiment, the predetermined gesture is a leftward gesture dragging the right edge of the content portion 2022. In one embodiment, the predetermined gesture is a rightward gesture dragging the left edge of the content portion 2022.

If the user input is not a predetermined gesture, the process may return to 801.

Otherwise, at 805, the screen mode control module 1021 may determine whether the distance of gesture of the user input on the touchscreen 103 exceeds a threshold distance. The threshold distance may be, e.g., 100 pixels.

If not, the screen mode control module 1021 may determine that the user input is not an input for exiting full screen mode, and the process may return to 801.

In one embodiment, the screen mode control module 1021 may control the processor 101 to display the hidden toolbar 2021 of the GUI 202 on the touchscreen 103, so as to inform the user that full screen mode may be turned off if he (she) continues the drag gesture, as shown in FIG. 9.

In a further embodiment, the screen control module 1021 may control to the processor 101 to animate the displayed toolbar 2021 so that it appears to follow the path of the overscroll input.

If the distance of the user input gesture exceeds the threshold distance, at 806, the screen mode control module 1021 may determine that the user input is an input to exit the full screen mode, and control the processor 101 to perform a routine to exit full screen mode shown in FIG. 3 and enter windowed screen mode shown in FIG. 2.

Figure 10:
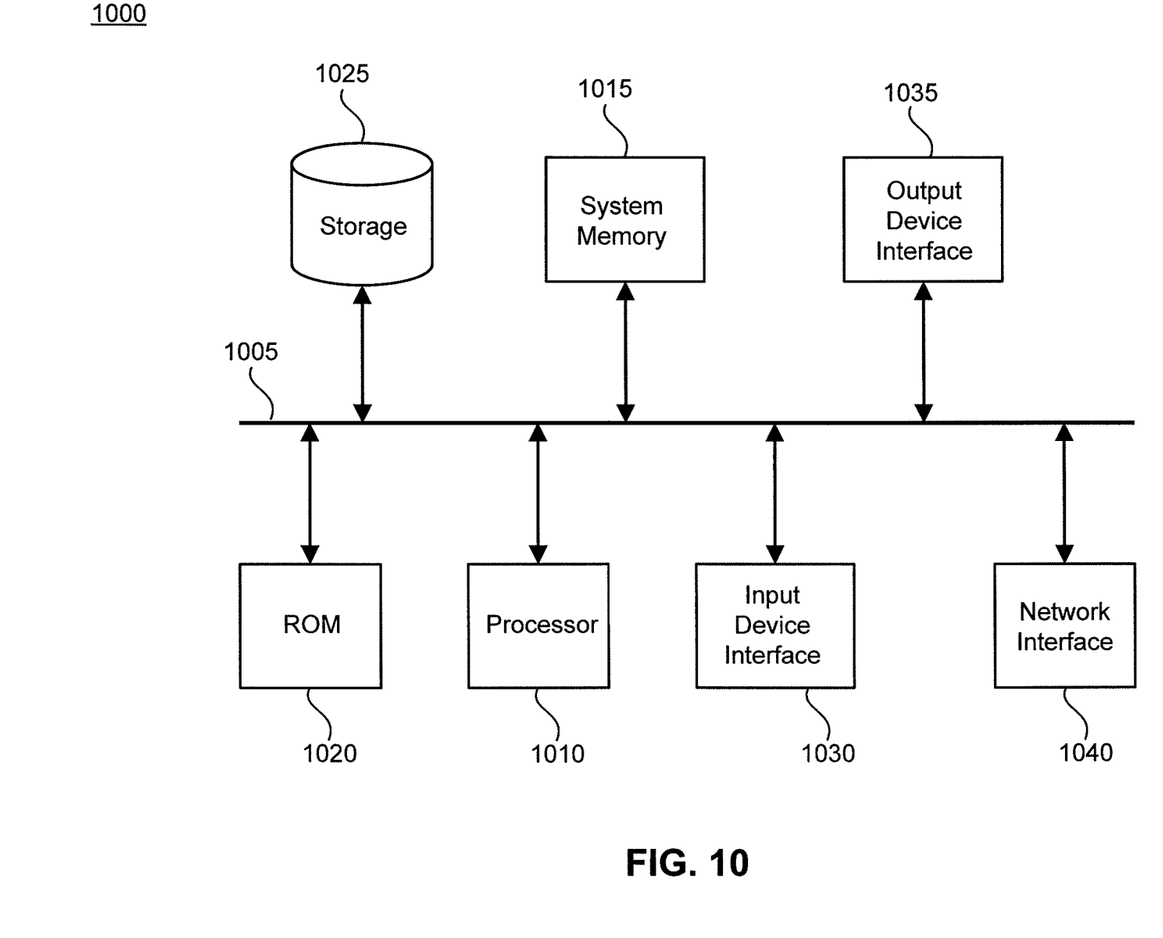
FIG. 10 conceptually illustrates an example electronic system with which some implementations of the subject technology are implemented.

FIG. 10 conceptually illustrates an electronic system 1000 with which some implementations of the subject technology are implemented. For example, the electronic device 1000 may be implemented using the arrangement of the electronic system 1000. The electronic system 1000 can be a computer (e.g., a mobile phone, PDA), or any other sort of electronic device. Such an electronic system includes various types of computer readable media and interfaces for various other types of computer readable media. Electronic system 1000 includes a bus 1005, processing unit(s) 1010, a system memory 1015, a read-only memory 1020, a permanent storage device 1025, an input device interface 1030, an output device interface 1035, and a network interface 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025.

From these various memory units, the processing unit(s) 1010 retrieves instructions to execute and data to process in order to execute the processes of the subject technology. The processing unit(s) can be a single processor or a multi-core processor in different implementations.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some implementations of the subject technology use a mass-storage device (for example a magnetic or optical disk and its corresponding disk drive) as the permanent storage device 1025.

Other implementations use a removable storage device (for example a floppy disk, flash drive, and its corresponding disk drive) as the permanent storage device 1025. Like the permanent storage device 1025, the system memory 1015 is a read-and-write memory device. However, unlike storage device 1025, the system memory 1015 is a volatile read-and-write memory, such a random access memory. The system memory 1015 stores some of the instructions and data that the processor needs at runtime. In some implementations, the processes of the subject technology are stored in the system memory 1015, the permanent storage device 1025, or the read-only memory 1020. For example, the various memory units include instructions for configuring networks in client computing devices in accordance with some implementations. From these various memory units, the processing unit(s) 1010 retrieves instructions to execute and data to process in order to execute the processes of some implementations.

The bus 1005 also connects to the input and output device interfaces 1030 and 1035. The input device interface 1030 enables the user to communicate information and select commands to the electronic system. Some implementations include devices for example a touchscreen that functions as both input and output devices.

Finally, as shown in FIG. 10, bus 1005 also couples electronic system 1000 to a network (not shown) through a network interface 1040. In this manner, the electronic system 1000 can be a part of a network of computers (for example a local area network ("LAN"), a wide area network ("WAN"), or an Intranet, or a network of networks, for example the Internet. Any or all components of electronic system 1000 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a touchscreen for displaying information to the user and receiving input from the user.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method for controlling screen mode of an application running on a touchscreen, the method comprising:
   displaying the application in full screen mode on the touchscreen, the application comprising a content portion having at least one edge;
   receiving, in association with the displayed application, an input gesture on the touchscreen;
   determining that the input gesture starts from within a predetermined number of lines of pixels corresponding to the at least one edge of the content portion of the application;
   determining, in response to determining that the input gesture starts from within the predetermined number of lines of pixels, that the input gesture is a first predetermined gesture, wherein the first predetermined gesture is a dragging gesture from within the predetermined number of lines of pixels toward the center of the content portion; and turning off full screen mode and switching the screen mode to windowed screen mode of the application in response to determining that the input gesture is the first predetermined gesture.

2. The method of claim 1, wherein the first predetermined gesture comprises one of a downward gesture dragging from a top edge of the content portion, an upward gesture dragging from a bottom edge of the content portion, a leftward gesture dragging from a right edge of the content portion, or a rightward gesture dragging from a left edge of the content portion.

3. The method of claim 1, further comprising:
determining whether a distance of the input gesture exceeds a predetermined threshold distance.

4. The method of claim 3, further comprising:
displaying a toolbar of the application on the touchscreen when the distance of the input gesture does not exceed the predetermined threshold distance.

5. The method of claim 3, further comprising:
turning off full screen mode and switching the screen mode to windowed screen mode of the application when distance of the input gesture exceeds the predetermined threshold distance.

6. The method of claim 1, further comprising:
receiving, in association with the displayed application, a second input gesture on the touchscreen;
determining that the second input gesture is a second predetermined gesture when full screen mode is turned off; and
turning on full screen mode in response to determining that the second input gesture is the second predetermined gesture.

7. The method of claim 6, further comprising:
determining whether the second input gesture starts from a second predetermined area on the touchscreen.

8. The method of claim 7, wherein the second predetermined area is a touch sensitive edge of a graphical user interface (GUI) of the application.

9. The method of claim 1, wherein the windowed screen mode displays the content portion of the application on a smaller scale and a toolbar of the application, and wherein the toolbar of the application is hidden in full screen mode.

10. The method of claim 1, wherein determining that the input gesture is the first predetermined gesture comprises:
distinguishing the input gesture from a scroll gesture.

11. A non-transitory computer-readable medium for controlling screen mode of an application running on a touchscreen, the computer-readable medium comprising instructions that, when executed by an electronic device, cause the electronic device to:
display the application in a windowed screen mode on the touchscreen, the application comprising a graphical user interface (GUI) having at least one edge;
receive, in association with the displayed application, an input gesture on the touchscreen;
determine that the input gesture starts from within a predetermined number of lines of pixels corresponding to the at least one edge of the GUI of the application;
determine, in response to determining that the input gesture starts from within the predetermined number of lines of pixels, that the input gesture is a first predetermined gesture, wherein the first predetermined gesture is a dragging gesture from within the predetermined number of lines of pixels and outward from the center of the GUI; and
turn off windowed screen mode and switch to full screen mode of the application in response to determining that the input gesture is the first predetermined gesture.

12. The non-transitory computer-readable medium of claim 11, wherein the instructions further cause the electronic device to:
receive, in association with the displayed application, a second input gesture on the touchscreen;
determine that the second input gesture is a second predetermined gesture for turning off full screen mode when the application is in full screen mode; and
turn off full screen mode in response to determining that the second input gesture is the second predetermined gesture for turning off full screen mode.

13. The non-transitory computer-readable medium of claim 11, wherein determining that the input gesture is the first predetermined gesture comprises:
distinguishing the input gesture from a scroll gesture.

14. An electronic device, comprising:
a processor;
a touchscreen, coupled to the processor via a bus; and
a memory, coupled to the processor and the touchscreen via the bus and storing instructions that, when executed by the electronic device, cause the electronic device to:
display an application in full screen mode on the touchscreen, the application comprising a content portion having at least one edge;
receive, in association with the displayed application, an input gesture on the touchscreen;
determine that the input gesture starts from within a predetermined number of lines of pixels corresponding to the at least one edge of the content portion of the application;
determine, in response to determining that the input gesture starts from within the predetermined number of lines of pixels, that the input gesture is a first predetermined gesture, wherein the first predetermined gesture is a dragging gesture from within the predetermined number of lines of pixels toward the center of the content portion; and
turn off full screen mode and switch to windowed screen mode of the application in response to determining that the input gesture is the first predetermined gesture.

15. The electronic device of claim 14, wherein the instructions further cause the electronic device to:
determine whether a distance of the input gesture exceeds a predetermined threshold distance; and
turn off full screen mode and switch to windowed screen mode of the application when distance of the input gesture exceeds the predetermined threshold distance.

16. The electronic device of claim 14, wherein the instructions further cause the electronic device to:
receive, in association with the displayed application, a second input gesture on the touchscreen;
determine that the second input gesture is a second predetermined gesture when full screen mode is turned off; and
turn on full screen mode in response to determining that the second input gesture is the second predetermined gesture.

* * * * *